(12) United States Patent
Itoh et al.

(10) Patent No.: US 11,634,637 B2
(45) Date of Patent: Apr. 25, 2023

(54) COMPOSITION AND LIQUID CRYSTAL DISPLAY DEVICE

(71) Applicant: SHARP KABUSHIKI KAISHA, Sakai (JP)

(72) Inventors: Tomonori Itoh, Sakai (JP); Masanobu Mizusaki, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 559 days.

(21) Appl. No.: 16/615,778

(22) PCT Filed: May 24, 2018

(86) PCT No.: PCT/JP2018/020009
§ 371 (c)(1),
(2) Date: Nov. 21, 2019

(87) PCT Pub. No.: WO2018/216769
PCT Pub. Date: Nov. 29, 2018

(65) Prior Publication Data
US 2020/0181491 A1    Jun. 11, 2020

(30) Foreign Application Priority Data

May 25, 2017   (JP) .............................. JP2017-103556

(51) Int. Cl.
| | | |
|---|---|---|
| *G09G 3/36* | (2006.01) | |
| *C09K 19/30* | (2006.01) | |
| *C08K 5/3475* | (2006.01) | |
| *C08L 101/02* | (2006.01) | |
| *C08L 101/08* | (2006.01) | |

(52) U.S. Cl.
CPC ........ *C09K 19/3003* (2013.01); *C08K 5/3475* (2013.01); *C08L 101/025* (2013.01); *C08L 101/08* (2013.01); *C09K 2019/301* (2013.01); *C09K 2019/3004* (2013.01)

(58) Field of Classification Search
CPC .............. G06F 1/337; G06F 1/133788; G06F 1/133738; C09K 19/3003; C09K 2019/3004; C09K 2019/301; C08K 5/3475; C08L 101/025; C08L 101/08
USPC ........................................................ 345/87
See application file for complete search history.

(56) References Cited

U.S. PATENT DOCUMENTS

| | | | | |
|---|---|---|---|---|
| 2001/0050353 A1* | 12/2001 | Sekine | ................... | C09K 19/18 252/299.66 |
| 2011/0267574 A1* | 11/2011 | Kawahira | ......... | G02F 1/133711 349/158 |
| 2013/0083278 A1 | 4/2013 | Teraoka et al. | | |

(Continued)

FOREIGN PATENT DOCUMENTS

| | | |
|---|---|---|
| JP | H10-148835 A | 6/1998 |
| JP | 2003-215592 A | 7/2003 |

(Continued)

*Primary Examiner* — Jennifer T Nguyen
(74) *Attorney, Agent, or Firm* — ScienBiziP, P.C.

(57) ABSTRACT

There is provided a composition including a first polymer compound having a photoreactive functional group, a second polymer compound, and an ultraviolet absorber having a benzotriazole skeleton, wherein a content of the ultraviolet absorber is less than 20 parts by mass per 100 parts by mass of a total of the first polymer compound and the second polymer compound.

9 Claims, 1 Drawing Sheet

(56) References Cited

U.S. PATENT DOCUMENTS

| | | | | |
|---|---|---|---|---|
| 2014/0111754 A1* | 4/2014 | Matsumoto | ....... | G02F 1/133723 |
| | | | | 349/123 |
| 2014/0227929 A1 | 8/2014 | Miyachi et al. | | |
| 2016/0313608 A1* | 10/2016 | Miyake | ............ | G02F 1/133788 |
| 2017/0066969 A1 | 3/2017 | Tsai | | |
| 2017/0355853 A1 | 12/2017 | Asagi et al. | | |
| 2018/0113337 A1* | 4/2018 | Mizusaki | ............... | C09K 19/54 |

FOREIGN PATENT DOCUMENTS

| | | | | | |
|---|---|---|---|---|---|
| JP | 2004-053914 A | | 2/2004 | | |
| JP | 2004053914 | * | 2/2004 | ........... | G02F 1/1333 |
| JP | WO2015020083 | * | 8/2014 | ........... | G02F 1/1337 |
| JP | 2016-180973 A | | 10/2016 | | |
| JP | 2017-054119 A | | 3/2017 | | |
| WO | 2011/155413 A1 | | 12/2011 | | |
| WO | 2012/056947 A1 | | 5/2012 | | |
| WO | 2013/031461 A1 | | 3/2013 | | |
| WO | 2015/020083 A1 | | 2/2015 | | |
| WO | 2016/084896 A1 | | 6/2016 | | |

\* cited by examiner

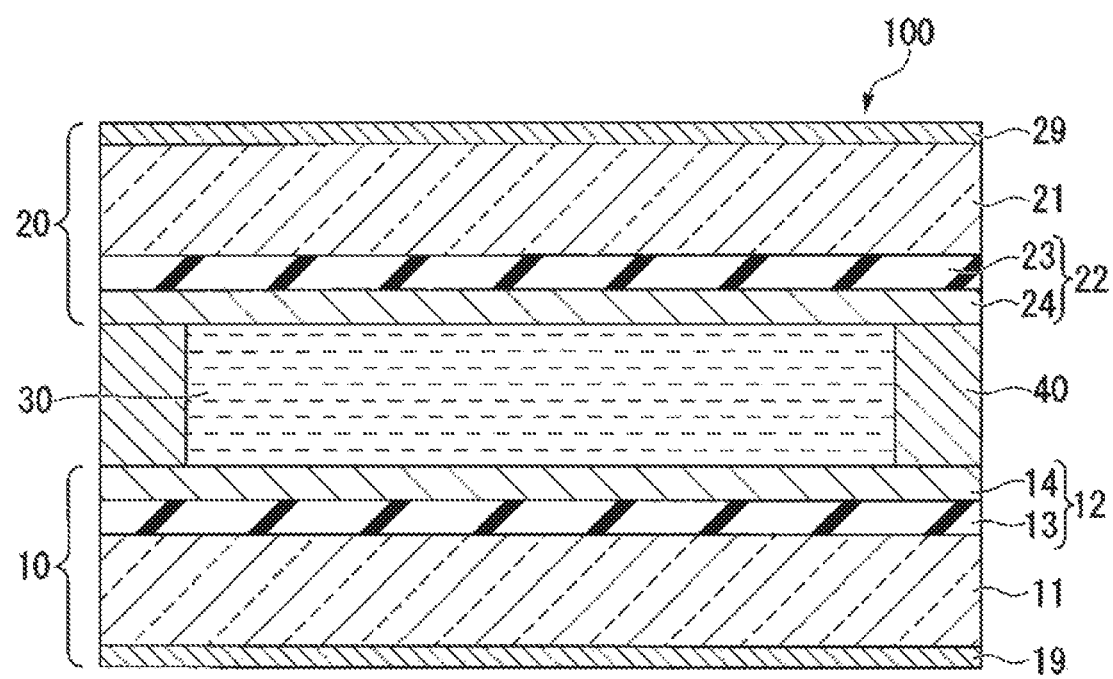

COMPOSITION AND LIQUID CRYSTAL DISPLAY DEVICE

TECHNICAL FIELD

Some aspects of the present invention relate to a composition and a liquid crystal display device.

The present application claims priority to Japanese Patent Application No. 2017-103556 filed in Japan on May 25, 2017, the contents of which are incorporated by reference herein.

BACKGROUND ART

Liquid crystal display devices have been in wide use as displays for mobile electronic devices such as smartphones, television sets, personal computers, and the like.

Liquid crystal display devices include a liquid crystal layer formed from a liquid crystal composition and alignment films between which the liquid crystal layer is sandwiched. The alignment films exhibit an anchoring force on liquid crystal molecules contained in the liquid crystal composition and provide the liquid crystal molecules with a predetermined pretilt angle. The performance of alignment films has a large effect on the performance of liquid crystal display devices. Accordingly, various materials for forming alignment films have been researched and proposed thus far to improve the performance of liquid crystal display devices.

Research has been carried out focusing on durability as the performance of liquid crystal devices. For example, PTL 1 discloses a liquid crystal alignment agent (material for forming alignment films) capable of providing liquid crystal display elements that do not experience a decrease in display quality even when exposed to strong light for a long period of time. A particular diamine is used as a raw material of the liquid crystal alignment agent described in PTL 1.

CITATION LIST

Patent Literature

PTL 1: Japanese Unexamined Patent Application Publication No. 2016-180973

SUMMARY OF INVENTION

Technical Problem

However, further improved durability of alignment films such as those described in PTL 1 has been required in response to market demand.

One aspect of the present invention has been achieved in light of such a situation. It is an object of one aspect of the present invention to provide a composition for forming alignment films capable of realizing a liquid crystal display device having high durability. Furthermore, it is an object of one aspect of the present invention to provide a liquid crystal display device including an alignment film formed of the composition.

Solution to Problem

The inventors, after research, speculate that a decreased performance of a liquid crystal display device is attributed to a side reaction of a polymer compound having a photoreactive functional group.

The inventors, as a result of intensive research, have found that the above problem can be solved by incorporating an ultraviolet absorber into a composition for forming alignment films, and have completed some aspects of the present invention.

One aspect of the present invention provides a composition including a first polymer compound having a photoreactive functional group, a second polymer compound, and an ultraviolet absorber having a benzotriazole skeleton, wherein a content of the ultraviolet absorber is less than 20 parts by mass per 100 parts by mass of a total of the first polymer compound and the second polymer compound.

In one aspect of the present invention, the ultraviolet absorber may be a compound represented by Formula (1) below:

[Chem. 1]

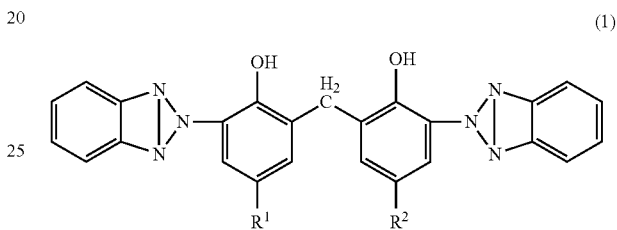

(1)

(wherein $R^1$ and $R^2$ each independently represent a hydrocarbon group of 1 to 30 carbon atoms.)

In one aspect of the present invention, the ultraviolet absorber may have a molecular weight of 600 or more.

In one aspect of the present invention, the content of the ultraviolet absorber may be 5 parts by mass or more per 100 parts by mass of the total of the first polymer compound and the second polymer compound.

In one aspect of present invention, the first polymer compound may be a polyimide, a polyamic acid, a polyamide, a polysiloxane, or a polyvinyl, and the second polymer compound may be a polyimide, a polyamic acid, a polyamide, a polysiloxane, or a polyvinyl.

In one aspect of present invention, the photoreactive functional group may be a group having an azobenzene skeleton, a cinnamate skeleton, or a cyclobutane ring.

One aspect of the present invention provides a liquid crystal display device including a pair of substrates, a liquid crystal layer sandwiched between the pair of substrates, and alignment films disposed on surfaces of the pair of substrates, the surfaces being on a side closer to the liquid crystal layer. The liquid crystal layer contains a liquid crystal material. At least one of the alignment films on the pair of substrates is a multilayer film including a first alignment film disposed on the side closer to the liquid crystal layer and a second alignment film disposed between the first alignment film and the substrate. The first alignment film contains the first polymer compound, the second alignment film contains the second polymer compound, and the multilayer film is formed from the above-described composition.

In one aspect of the present invention, the liquid crystal material may contain a compound having an alkenyl skeleton.

In one aspect of the present invention, the liquid crystal material may be at least one selected from the group consisting of compounds represented by Formulas (C1) to (C4) below:

[Chem. 2]

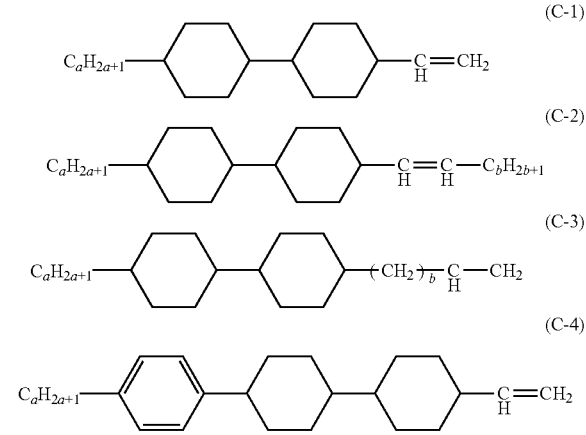

(wherein a and b each independently represent an integer of 1 to 6.)

In one aspect of the present invention, the liquid crystal material may be negative, and the photoreactive functional group may be a group having a cyclobutane ring.

Advantageous Effects of Invention

In one aspect of the present invention, there is provided a composition for forming alignment films capable of realizing a liquid crystal display device having high durability. There is also provided a liquid crystal display device including an alignment film formed of the composition.

BRIEF DESCRIPTION OF DRAWINGS

FIG. 1 is a sectional view schematically illustrating a liquid crystal display device according to the present embodiment.

DESCRIPTION OF EMBODIMENTS

Hereafter, an embodiment of a composition and a liquid crystal display device according to some aspects of the present invention will be described with reference to FIG. 1. It is to be noted that in all the drawings below, the size, the ratio, and other particulars of each element are varied as appropriate for clarity of the drawings.
<Liquid Crystal Display Device>

FIG. 1 is a sectional view schematically illustrating a liquid crystal display device according to the present embodiment. As illustrated in FIG. 1, a liquid crystal display device 100 according to the present embodiment includes an element substrate 10, a counter substrate 20, a liquid crystal layer 30 sandwiched between the element substrate 10 and the counter substrate 20, and a sealing member 40. The element substrate 10 and the counter substrate 20 correspond to "a pair of substrates" in the claims.

An FFS (Fringe Field Switching) mode device configuration is used in the liquid crystal display device 100 in FIG. 1. In other words, the liquid crystal display device 100 is a horizontal alignment mode liquid crystal display device.

It is to be noted that the liquid crystal display device according to one aspect of the present invention is applicable not only to liquid crystal display devices in horizontal alignment modes but also to liquid crystal display devices in various alignment modes. Examples of applicable alignment modes of liquid crystal display devices include TN (Twisted Nematic), STN (Super-Twisted Nematic), IPS (In Plane Switching), ECB (Electrically Controlled Birefringence), VA (Vertical Alignment), MVA (Multi Vertical Alignment), 4D-VTN (4-Domain Vertical TN), 4D-VECB (4-Domain Vertical ECB), and UV2A (Ultraviolet Induced Multi-Domain Vertical Alignment) modes.

[Element Substrate]

The element substrate 10 in FIG. 1 includes a TFT (Thin Film Transistor) substrate 11, an alignment film 12 for the element substrate disposed on a surface of the TFT substrate 11, the surface being on a side closer to the liquid crystal layer 30, and a first polarizer 19 disposed on a side of the TFT substrate 11, the side facing away from the liquid crystal layer 30.

The TFT substrate 11 includes driving TFT elements (not illustrated). A drain electrode, a gate electrode, and a source electrode of each of the TFT driving elements are electrically connected to a pixel electrode, a gate busline, and a source busline, respectively. The individual pixels are electrically connected through the electrical wiring of the source buslines and the gate buslines.

The TFT substrate 11 may be an active matrix substrate which has a driving TFT in each pixel. A simple matrix liquid crystal display device which does not have a driving TFT in each pixel is also acceptable.

A generally known material may be used as a material for forming each member of the TFT substrate 11.

The alignment film 12 for the element substrate according to the present embodiment is a multilayer film including a first alignment film 14 disposed on the side of the TFT substrate 11, the side being closer to the liquid crystal layer 30 and a second alignment film 13 disposed between the first alignment film 14 and the TFT substrate 11.

A polarizer having a generally known configuration may be used as the first polarizer 19.

The alignment film 12 for the element substrate is formed from the composition according to the present embodiment. The composition according to the present embodiment used for the alignment film 12 for the element substrate includes a first polymer compound having a photoreactive functional group, a second polymer compound, and an ultraviolet absorber having a benzotriazole skeleton. The first polymer compound having a photoreactive functional group has an anchoring force on liquid crystal molecules contained in the liquid crystal layer 30. On the other hand, the second polymer compound adjusts the resistance throughout the alignment film 12 for the element substrate.

The first polymer compound contained in the composition according to the present embodiment is preferably a polyimide, a polyamic acid, a polyamide, a polysiloxane, or a polyvinyl. Furthermore, the second polymer compound contained in the composition according to the present embodiment is preferably a polyimide, a polyamic acid, a polyamide, a polysiloxane, or a polyvinyl. In the composition according to the present embodiment, any combination of the first polymer compound and the second polymer compound may be used.

(Polyamic Acids)

The polyamic acids contained in the composition according to the present embodiment are now described.

The polyamic acid used as the first polymer compound may be herein referred to as "polyamic acid (1)", and the polyamic acid used as the second polymer compound may be herein referred to as "polyamic acid (2)".

The polyamic acid (2) contained in the second alignment film 13 may be a polyamic acid represented by Formula (10) below. The polyamic acid (2) may be a polyamic acid represented by Formula (10) in which the X unit is represented by any of Formulas (X-1) to (X-11) below and the E unit is represented by any of Formulas (E-1) to (E-11) below.

[Chem. 3]

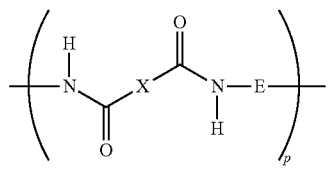

(10)

(where p represents the degree of polymerization.)

[Chem. 4]

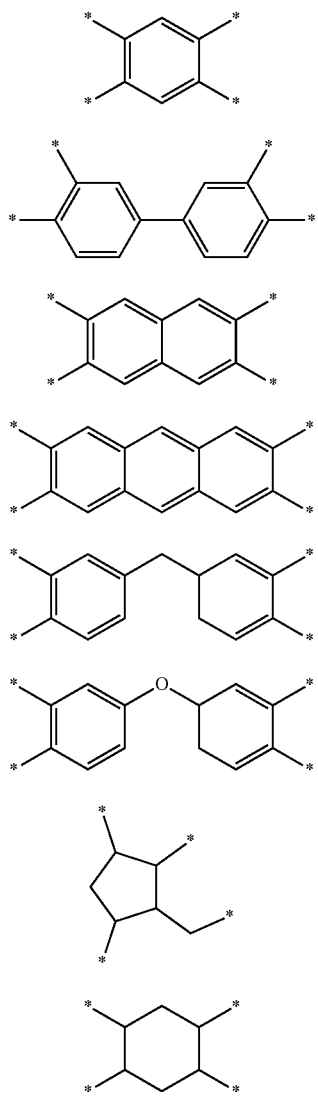

(X-1)
(X-2)
(X-3)
(X-4)
(X-5)
(X-6)
(X-7)
(X-8)

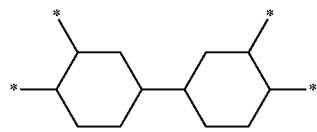 (X-9)

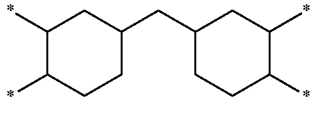 (X-10)

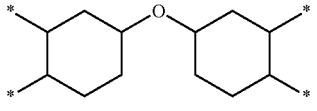 (X-11)

[Chem. 5]

 (E-1)

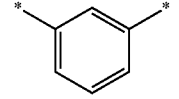 (E-2)

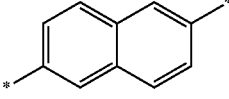 (E-3)

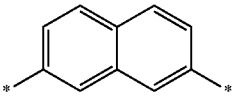 (E-4)

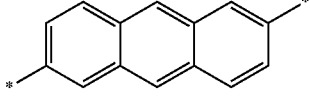 (E-5)

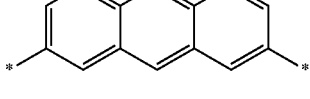 (E-6)

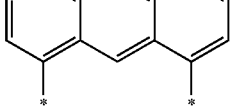 (E-7)

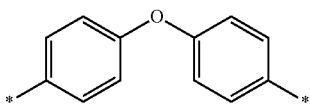 (E-8)

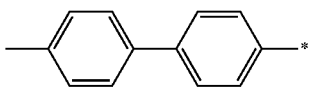 (E-9)

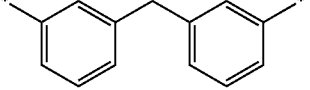 (E-10)

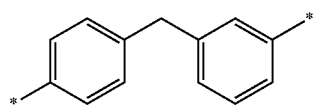
(E-11)

In the polyamic acid (2), two of the four bonds in the X unit represented by any of Formulas (X-1) to (X-11) above are formed with carboxy groups.

Of the polyamic acids contained in the first alignment film 14, the polyamic acid (1) having a photoreactive functional group may be a polyamic acid (2) in which either or both of the X unit and the E unit in the basic structure thereof are replaced by any of the below-described photoreactive functional groups.

Specifically, examples of photoreactive functional groups that can be used for the X unit represented by Formula (10) above can include groups having an azobenzene skeleton represented by Formula (X-101) below and groups having a cyclobutane ring represented by Formula (X-102) below.

[Chem. 6]

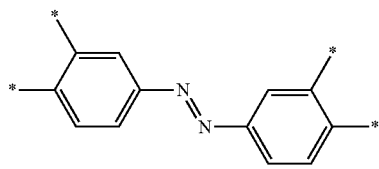
(X-101)

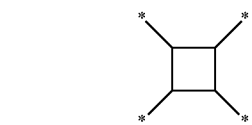
(X-102)

Furthermore, examples of photoreactive functional groups that can be used for the E unit can include those represented by Formulas (E-101) to (E-106) below.

[Chem. 7]

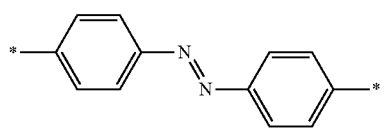
(E-101)

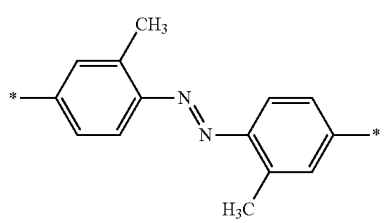
(E-102)

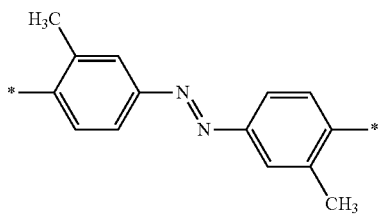
(E-103)

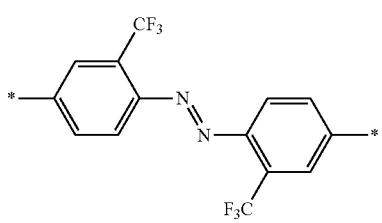
(E-104)

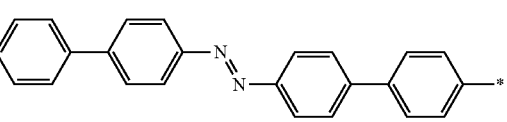
(E-105)

(E-106)

A polyamic acid (1) having a vertical alignment group may be a polyamic acid represented by Formula (11) below. Examples of polyamic acids (1) having a vertical alignment group can include those represented by Formula (11) in which the X unit is represented by any of Formulas (X-1) to (X-11) above, the E unit is represented by any of Formulas (E-21) to (E-36) below, and the Z unit is a group represented by any of Formulas (Z-1) to (Z-7) below:

[Chem. 8]

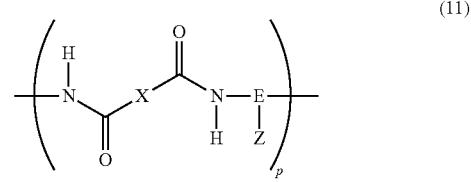
(11)

(where p represents the degree of polymerization.)

[Chem. 9]

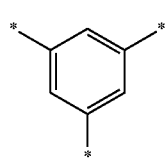
(E-21)

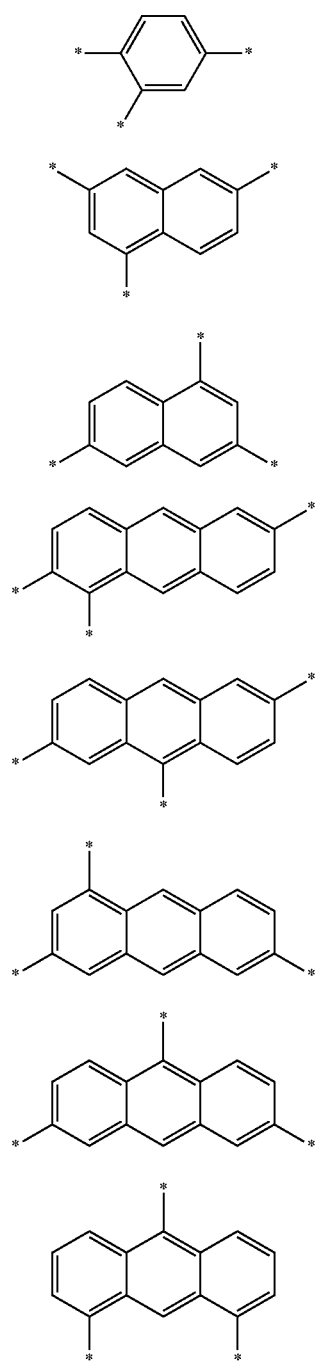
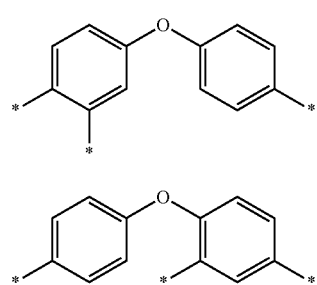
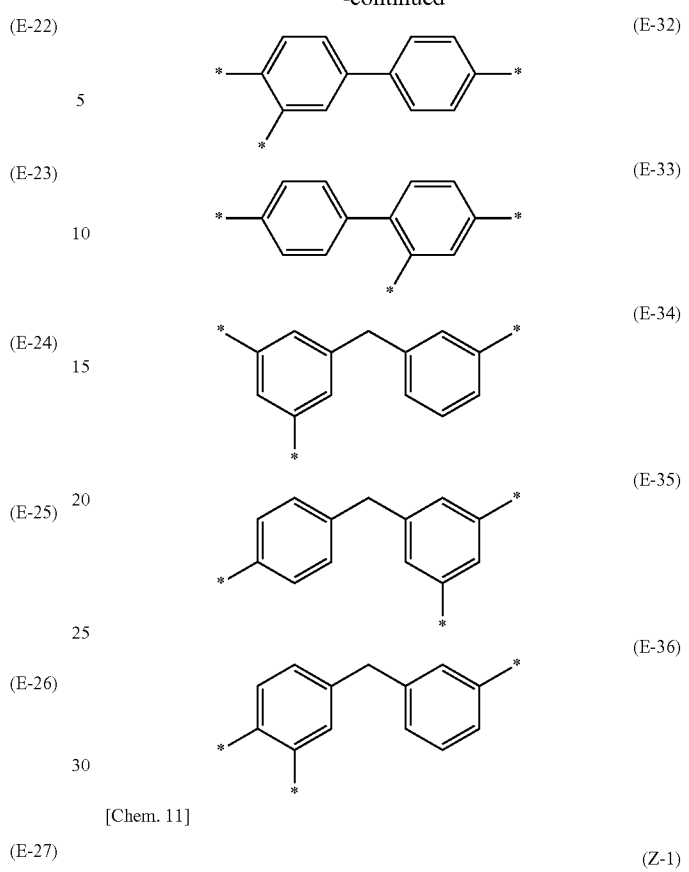
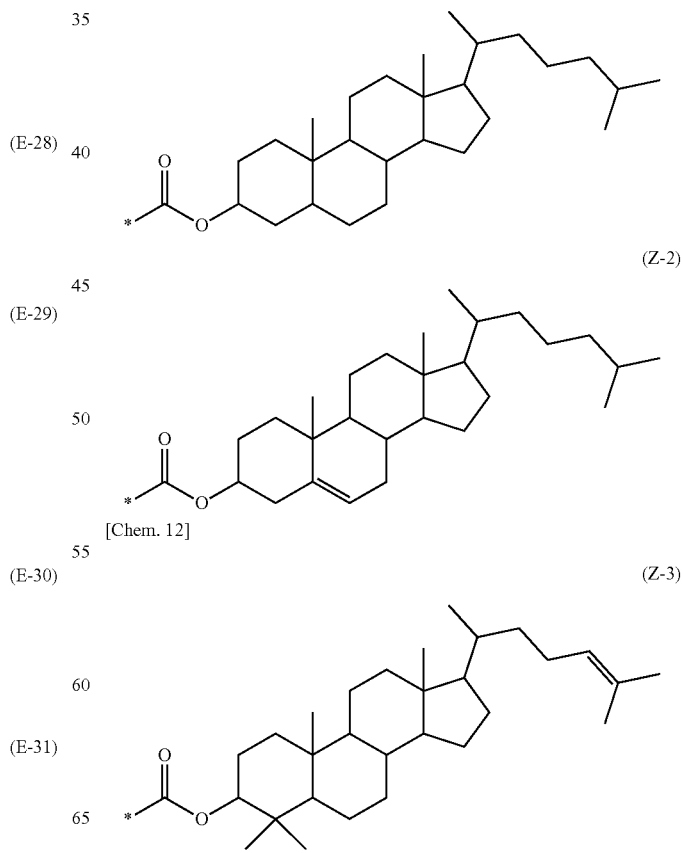

-continued (Z-4)
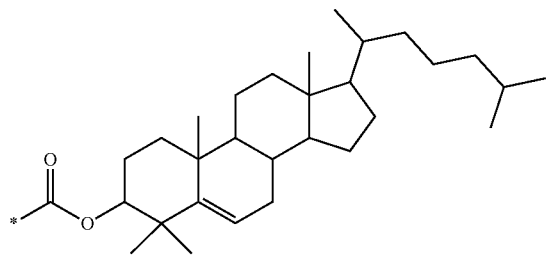

[Chem. 13]

(Z-5)
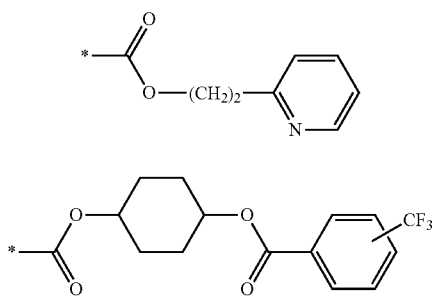

(Z-6)

(Z-7)
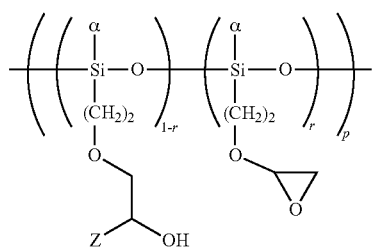

(Polysiloxanes)

The polysiloxanes contained in the composition according to the present embodiment are now described.

The polysiloxanes used as the first polymer compound may be a polysiloxane represented by Formula (20) or (21) below. The Z units in side chains of the polysiloxanes represented by Formulas (20) and (21) have a photoreactive functional group covalently bonded thereto.

[Chem. 14]

(20)
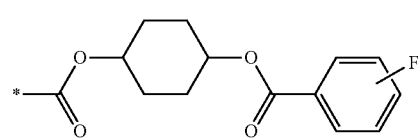

(where α represents a hydrogen atom, a hydroxy group, or an alkoxy group. The plurality of α may be the same or may differ from one another.

r is 0<r<1.0. (1−r) and r each represent the copolymerization ratio of a structural unit, and p represents the degree of polymerization.)

[Chem. 15]

(21)
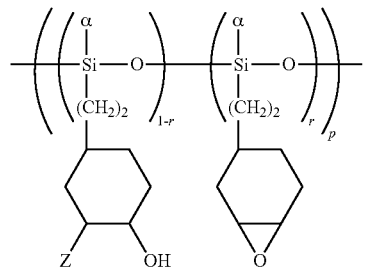

(where α represents a hydrogen atom, a hydroxy group, or an alkoxy group. The plurality of α may be the same or may differ from one another.

r is 0<r<1.0. (1−r) and r each represent the copolymerization ratio of a structural unit, and p represents the degree of polymerization.)

Examples of vertical alignment groups that can be used for the Z units in Formulas (20) and (21) above can include groups having a cinnamate skeleton represented by Formula (Z-224) or (Z-225) below.

[Chem. 16]

(Z-224)
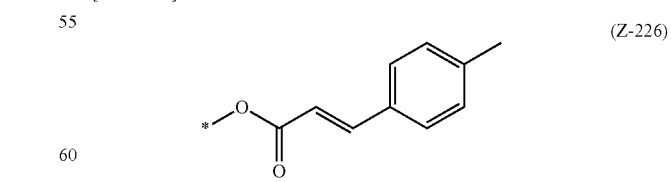

[Chem. 17]

(Z-225)
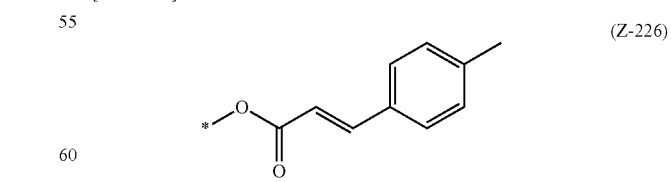

Examples of horizontal alignment groups that can be used for the Z units in Formulas (20) and (21) above can include those represented by Formula (Z-226) below.

[Chem. 18]

(Z-226)
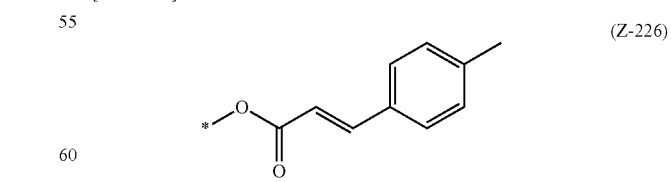

(Polyvinyls)

The polyvinyls contained in the composition according to the present embodiment are now described.

The polyvinyl used as the first polymer compound may be a polyvinyl represented by Formula (30) below. The Z unit in a side chain of the polyvinyl represented by Formula (30) has a photoreactive functional group covalently bonded thereto.

[Chem. 19]

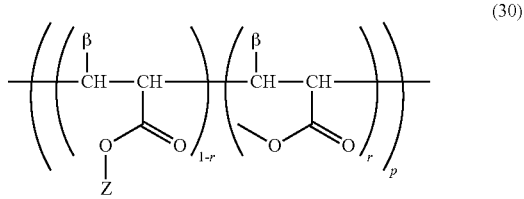

(30)

(where β represents a hydrogen atom, a methyl group, or an ethyl group. The plurality of β may be the same or may differ from one another.

r is 0<r<1.0. (1−r) and r each represent the copolymerization ratio of a structural unit, and p represents the degree of polymerization.)

Examples of vertical alignment groups that can be used for the Z unit in Formula (30) above can include those represented by Formula (Z-224) or (Z-225) above.

Examples of horizontal alignment groups that can be used for the Z unit in Formula (30) above can include those represented by Formula (Z-226) above.

The composition according to the present embodiment undergoes layer separation during the deposition of the composition in the below-described method for manufacturing the liquid crystal display device 100. Thus, the first alignment film 14 has a large content of the first polymer compound in the composition according to the present embodiment. On the other hand, the second alignment film 13 has a large content of the second polymer compound in the composition according to the present embodiment.

As described above, the first polymer compound has an anchoring force because of having a photoreactive functional group. Thus, when the first alignment film 14 has a large content of the first polymer compound, the liquid crystal display device can achieve high contrast.

In the composition according to the present embodiment, a combination of the first polymer compound and the second polymer compound is selected such that such layer separation occurs. A compound having a higher polarity than the second polymer compound is selected as the first polymer compound in the composition according to the present embodiment. Particularly when the first polymer compound and the second polymer compound have the same skeleton, groups having a higher polarity than units contained in the repeat units of the second polymer compound are selected as units contained in the repeat units of the first polymer compound.

Examples of combinations of the first polymer compound and the second polymer compound include a combination of a polysiloxane having a photoreactive functional group as the first polymer compound and a polyamic acid as the second polymer compound and a combination of a polyamic acid having a photoreactive functional group as the first polymer compound and a polyamic acid having no photoreactive functional group as the second polymer compound.

When the multilayer structure of the alignment film 12 for the element substrate or the multilayer structure of an alignment film 22 for the counter substrate is formed layer-by-layer, the first alignment film does not contain a component derived from the second polymer compound which is a material for forming the second alignment film, while the second alignment film does not contain a component derived from the first polymer compound which is a material for forming the first alignment film.

Thus, when such layer-by-layer formation is performed, for example, in the case of the alignment film 12 for the element substrate, the measurement of the content of a predetermined substituent in the second polymer compound in the thickness direction indicates a discontinuity at the interface between the first alignment film 14 and the second alignment film 13.

In the case of the alignment film 22 for the counter substrate, the measurement of the content of a predetermined substituent in the second polymer compound in the thickness direction indicates a discontinuity at the interface between a first alignment film 24 and a second alignment film 23. Thus, the resulting alignment films are different from the alignment films according to one aspect of the present invention.

On the other hand, in the alignment film 12 for the element substrate in one aspect of the present invention, in which the layer structure is formed by using the above-described composition and by utilizing layer separation, the content of a predetermined substituent in the second polymer compound gradually decreases in the direction away from the TFT substrate 11. Furthermore, in the alignment film 22 for the counter substrate, the content of a predetermined substituent in the second polymer compound gradually decreases in the direction away from a color filter substrate 21.

Any target for analysis may be used as long as a trace of the first polymer compound or a trace of the second polymer compound can be confirmed. By thus confirming a trace of the first polymer compound or a trace of the second polymer compound, whether or not alignment films are fabricated by using the composition according to one aspect of the present invention can be confirmed.

(Ultraviolet Absorber)

The ultraviolet absorber contained in the composition according to the present embodiment is now described.

In some cases, a liquid crystal display device in which an existing alignment film material (composition) containing a polymer compound having a photoreactive functional group is used may experience a decrease in VHR (Voltage Holding Ratio) when used. Furthermore, in other cases, a liquid crystal display device in which such an existing alignment film material is used may experience an increase in rDC (residual DC, residual Direct Current voltage).

Research conducted by the inventors has revealed that such a decreased performance of a liquid crystal display device is attributed to a side reaction of a polymer compound having a photoreactive functional group. Such a side reaction of a polymer compound having a photoreactive functional group is now described below with reference to Formula (I) below.

[Chem. 20]

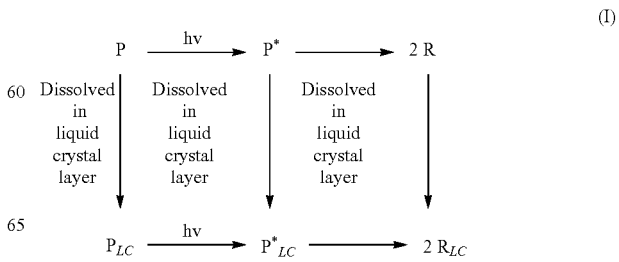

(I)

-continued

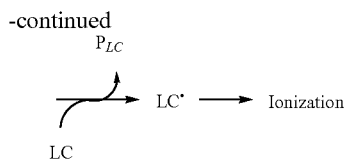

(P: polymer compound having photoreactive functional group, P*: polymer compound having photoreactive functional group in photoexcited state, R: radical generated from polymer compound having photoreactive functional group, LC: liquid crystal molecule, LC.: radical generated from reaction of liquid crystal molecule)

In some cases, ultraviolet light emitted from a backlight of a liquid crystal display device may photodegrade (photodecompose) a polymer compound having a photoreactive functional group. A photodecomposed polymer compound having a photoreactive functional group tends to be dissolved in the liquid crystal composition in the liquid crystal layer 30. It is speculated that when such a photodecomposed polymer compound having a photoreactive functional group is dissolved in the liquid crystal composition, the performance of the liquid crystal display device decreases.

Furthermore, ultraviolet light emitted from a backlight can generate radicals from a polymer compound having a photoreactive functional group. When the liquid crystal molecules contained in the liquid crystal layer 30 have an alkenyl skeleton, these radicals can be transferred to the liquid crystal molecules, resulting in the liquid crystal molecules forming radicals. The radicals generated from the liquid crystal molecules react with the surrounding substances to form an ionic compound. The ionic compound decreases the specific resistance of the liquid crystal composition in the liquid crystal layer 30. It is speculated that, as a result, the performance of the liquid crystal display device decreases.

On the other hand, to suppress the reaction represented by Formula (I), for example, decreasing the content of a polymer compound having a photoreactive functional group can be considered. However, decreasing the content of a polymer compound having a photoreactive functional group may result in a lack of an anchoring force and a failure to realize a desired liquid crystal alignment state.

The inventors, as a result of intensive research, have found that the above-described problem can be solved by incorporating an ultraviolet absorber having a benzotriazole skeleton into a composition for forming alignment films (the alignment film 12 for the element substrate and the below-described alignment film 22 for the counter substrate), and have completed some aspects of the present invention.

The ultraviolet absorber having a benzotriazole skeleton can absorb long-wavelength light at up to about 400 nm. Thus, because the ultraviolet absorber having a benzotriazole skeleton absorbs ultraviolet light emitted from a backlight, an ultraviolet light-induced side reaction of a polymer compound having a photoreactive functional group can be suppressed.

Furthermore, the ultraviolet absorber having a benzotriazole skeleton has high thermal stability. Consequently, the performance of the liquid crystal display device 100 can be maintained.

In addition, when the composition according to the present embodiment contains a polyamic acid, a hydrogen bond is easily formed between an amide group or a carboxy group in the polyamic acid and a triazole group of the ultraviolet absorber. Thus, the ultraviolet absorber having a benzotriazole skeleton can be easily incorporated into the polyamic acid.

For example, when a polysiloxane having a photoreactive functional group is used as the first polymer compound and a polyamic acid is used as the second polymer compound, a large amount of the ultraviolet absorber having a benzotriazole skeleton is incorporated into the polyamic acid forming the second alignment film 13 positioned on a side closer to the TFT substrate 11. Thus, ultraviolet light emitted from a backlight can be effectively absorbed. As a result, an ultraviolet light-induced side reaction of a polymer compound having a photoreactive functional group can be suppressed. Consequently, the performance of the liquid crystal display device 100 can be maintained.

On the other hand, the polysiloxane forming the first alignment film 14 contains a relatively small amount of the ultraviolet absorber having a benzotriazole skeleton. As a result, the ultraviolet absorber having a benzotriazole skeleton has only a small effect on the anchoring force of the first alignment film 14.

The distribution of the above-described ultraviolet absorber can be confirmed by measuring, by using a TOF-SIMS (Time-of-Flight Secondary Ion Mass Spectrometry), the first alignment film 14 and the second alignment film 13.

The molecular weight of the ultraviolet absorber having a benzotriazole skeleton is preferably 600 or more, more preferably 650 or more.

When having a molecular weight of 600 or more, the ultraviolet absorber can be suppressed from being volatilized during firing of a thin film of the composition in the below-described method for manufacturing the liquid crystal display device 100. Thus, a sufficient amount of the ultraviolet absorber can be left in the resulting alignment films (the alignment film 12 for the element substrate and the below-described alignment film 22 for the counter substrate) for the liquid crystal display device. As a result, ultraviolet light emitted from a backlight can be effectively absorbed. Thus, according to the present embodiment, an ultraviolet light-induced side reaction of a polymer compound having a photoreactive functional group can be suppressed.

Even more preferably, the ultraviolet absorber having a benzotriazole skeleton is a compound represented by Formula (1) below:

[Chem. 21]

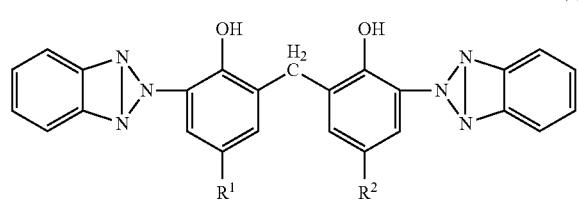

(1)

(where $R^1$ and $R^2$ each independently represent a hydrocarbon group of 1 to 30 carbon atoms.)

The hydrocarbon groups represented by $R^1$ and $R^2$ may be linear, branched, or cyclic. The hydrocarbon groups represented by $R^1$ and $R^2$ may be saturated or unsaturated.

Examples of hydrocarbon groups represented by $R^1$ and $R^2$ include an octyl group.

When a polyamic acid is contained in the composition according to the present embodiment, the following effect can be expected from the use of a compound represented by Formula (1) in addition to a hydrogen bond between an amide group or a carboxy group in the polyamic acid and a triazole group of the compound represented by Formula (1). That is, a hydrogen bond can be easily formed between an amide group in the polyamic acid and a hydroxyl group represented by Formula (1). Thus, a larger amount of benzotriazole compound can be incorporated into the polyamic acid.

The content of the ultraviolet absorber is less than 20 parts by mass per 100 parts by mass of the total of the first polymer compound and the second polymer compound. When the content of the ultraviolet absorber is less than 20 parts by mass, the resulting alignment films (the alignment film 12 for the element substrate and the below-described alignment film 22 for the counter substrate) are less likely to become cloudy and are therefore more likely to be good.

Furthermore, the content of the ultraviolet absorber is preferably 5 parts by mass or more. When the content of the ultraviolet absorber is 5 parts by mass or more, ultraviolet light emitted from a backlight can be sufficiently absorbed. As a result, an ultraviolet light-induced side reaction of a polymer compound having a photoreactive functional group can be suppressed. Accordingly, the performance of the liquid crystal display device 100 can be maintained.

[Counter Substrate]

The counter substrate 20 in FIG. 1 includes the color filter substrate 21, the alignment film 22 for the counter substrate disposed on a surface of the color filter substrate 21, the surface being on a side closer to the liquid crystal layer 30, and a second polarizer 29 disposed on a side of the color filter substrate 21, the side facing away from the liquid crystal layer 30.

The color filter substrate 21 has, for example, a red color filter layer which absorbs a portion of incident light and allows red light to pass therethrough, a green color filter layer which absorbs a portion of incident light and allows green light to pass therethrough, and a blue color filter layer which absorbs a portion of incident light and allows blue light to pass therethrough.

The alignment film 22 for the counter substrate is a multilayer film including the first alignment film 24 disposed on the side of the color filter substrate 21, the side being closer to the liquid crystal layer 30, and the second alignment film 23 disposed between the first alignment film 24 and the color filter substrate 21.

The alignment film 22 for the counter substrate is an alignment film formed from the above-described composition according to the present embodiment.

The first alignment film 24 contains the above-described first polymer compound.

The second alignment film 23 contains the above-described second polymer compound.

A polarizer having a generally known configuration may be used as the second polarizer 29. The first polarizer 19 and the second polarizer 29 are, for example, set in a crossed Nicols arrangement.

[Liquid Crystal Layer]

The liquid crystal layer 30 is formed from a liquid crystal composition containing a liquid crystal material. The liquid crystal material is a material containing liquid crystal molecules having liquid crystal properties.

The liquid crystal material may be formed solely of liquid crystal molecules exhibiting liquid crystal properties alone. Alternatively, the liquid crystal material may be a mixture that includes liquid crystal molecules exhibiting liquid crystal properties alone and an organic compound not exhibiting liquid crystal properties alone and that exhibits liquid crystal properties as a whole.

Preferably, the liquid crystal material contains liquid crystal molecules having a functional group represented by Formula (B) below.

[Chem. 22]

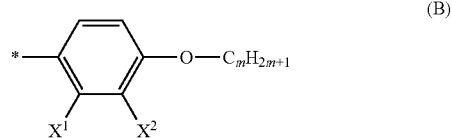

(where $X^1$ and $X^2$ each independently represent a hydrogen atom, a fluorine atom, or a chlorine atom, and m represents an integer of 1 to 18.)

Examples of usable liquid crystal molecules can include Formulas (B-1) to (B-5) below.

[Chem. 23]

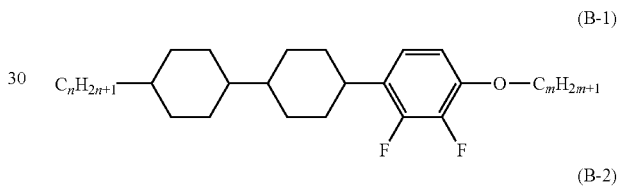

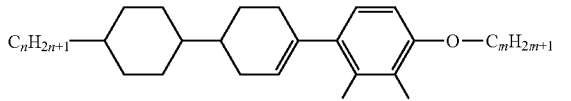

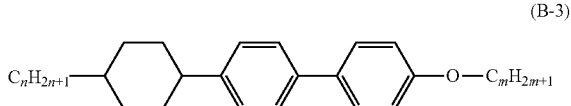

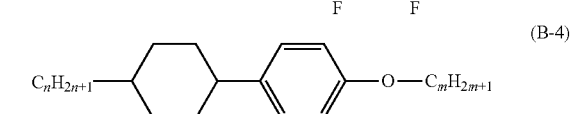

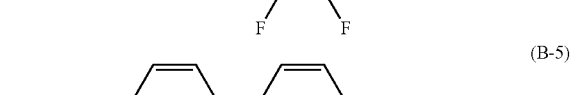

(where m and n each represent an integer of 1 to 18.)

Furthermore, the liquid crystal material preferably contains a compound having an alkenyl skeleton. Specifically, the liquid crystal material preferably contains at least one compound selected from the group consisting of Formulas (C-1) to (C-4) below. A liquid crystal display device can have an improved response speed through the use of a liquid crystal layer formed from such a liquid crystal material in the liquid crystal display device.

[Chem. 24]

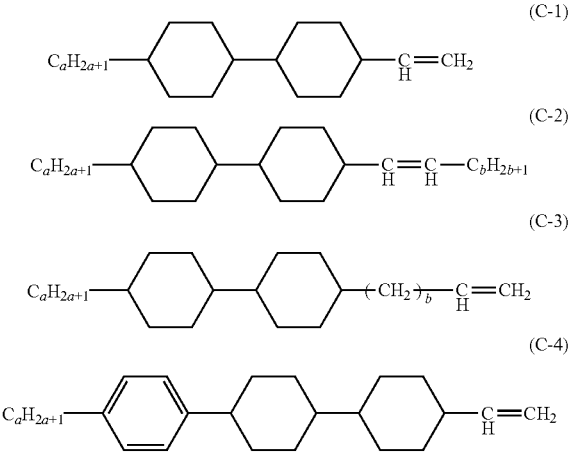

(where a and b each independently represent an integer of 1 to 6.)

Examples of liquid crystal materials contained in the liquid crystal layer 30 can include a compound represented by Formula (C-10) below. The compound represented by Formula (C-10) below is a compound represented by Formula (C-1) above in which a=3.

[Chem. 25]

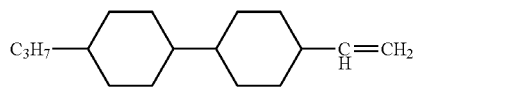

(Sealing Member)

The sealing member 40 is sandwiched between the element substrate 10 and the counter substrate 20 and is disposed around the liquid crystal layer 30. The sealing member 40 is in contact with the liquid crystal composition which is a material for forming the liquid crystal layer 30 and keeps the liquid crystal composition from leaking.

The sealing member 40 is formed from a curable resin composition (sealant). The curable resin composition for use may be any composition that has an ultraviolet reactive functional group and a thermoreactive functional group including, but not limited to, known curable resin compositions.

The curable resin composition which is a material for forming the sealing member 40 may contain a silane coupling agent. The curable resin composition, when containing a silane coupling agent, enables improved adhesion between the sealing member 40 and the substrates (the element substrate 10 and the counter substrate 20).

The silane coupling agent for use may be any silane coupling agent including, but not limited to, known silane coupling agents.

The curable resin composition which is a material for forming the sealing member 40 may contain a filler for the purpose of, for example, improving the adhesion and the linear expansion coefficient by a stress dispersion effect as long as it does not run counter to the objects of the invention.

Furthermore, the curable resin composition which is a material for forming the sealing member 40 may contain a gelling agent or a photosensitizer for photoreaction.

In addition, the liquid crystal display device 100 may have a spacer which is a columnar structure defining the thickness of the liquid crystal layer 30.

<Method for Manufacturing Liquid Crystal Display Device>

The above-described liquid crystal display device 100 according to the present embodiment is manufactured by using a known manufacturing method. First, the composition according to the present embodiment is applied to a surface of the element substrate 10 and to a surface of the counter substrate 20 to deposit films. During the process, the second polymer compound moves to a side closer to the substrates, and the first polymer compound moves to a position relatively distant from the substrates, resulting in layer separation.

Next, the composition after layer separation is fired. An alignment process is then performed by irradiating the thin films of the composition with polarized ultraviolet light. Thus, alignment films having a double-layer structure in which the first polymer compound is the first alignment film 14 and the second polymer compound is the second alignment film 13 are obtained.

Subsequently, a curable resin composition is drawn on the alignment film on one of the element substrate 10 and the counter substrate 20, and a liquid crystal composition is dropped onto the other alignment film. Furthermore, after the element substrate 10 and the counter substrate 20 are bonded together under vacuum, the curable resin composition is cured by ultraviolet light or heat.

Subsequently, polarizers (the first polarizer 19 and the second polarizer 29) are bonded to the other surface of the element substrate 10 and the other surface of the counter substrate 20. The liquid crystal display device 100 can thus be obtained.

By using the composition configured as described above, the composition for forming alignment films capable of realizing a liquid crystal display device having high durability can be obtained. In other words, a liquid crystal display device having high durability can be realized because of having alignment films formed of the composition.

Thus, an embodiment of the present invention has been described above, but the configurations, combinations thereof, and other particulars of the present embodiment are merely examples, and additions, omissions, substitutions, and other modifications can be made to the configurations without departing from the spirit of the present invention. Furthermore, the present invention is not limited to the embodiment.

EXAMPLES

Hereafter, the present invention will be described with reference to examples, but the present invention is not limited to these examples.

(VHR Measurement)

A measurement was made by using a Model 6254 VHR measurement system manufactured by TOYO Corporation at 1 V and 70° C. As used herein, "VHR" refers to the ratio at which accumulated electric charge is retained over one frame period.

A liquid crystal display device having a larger VHR can be determined to be better. Furthermore, a liquid crystal display device that exhibits a smaller decrease in VHR from before to after a durability test can be determined to have higher durability.

(rDC Measurement)

A measurement was made by using a flicker elimination method at 30° C. The rDC was measured after a DC offset voltage of 2 V (60 Hz square wave) was applied for two hours.

A liquid crystal display device having a smaller rDC can be determined to be better. Furthermore, a liquid crystal display device that exhibits a smaller increase in rDC from before to after a durability test can be determined to have higher durability.

In Examples and Comparative Examples below, the VHR and the rDC were measured before and after each durability test under the below-described conditions, and durability was confirmed based on the amount of change in the values. The VHR and the rDC were compared in each of <Evaluation 1> to <Evaluation 3>, and no superior-inferior evaluation was made based on a comparison of numerical values in the evaluations under different conditions.

(Durability Test)

Each resulting liquid crystal cell was exposed to light from a backlight in an oven at 75° C. for 1000 hours. The VHR and the rDC were measured before and after the durability test, and durability was evaluated.

In all of Evaluations 1 to 3, the content of the first polymer compound was 20% by mass based on the total of the first polymer compound and the second polymer compound, and the content of the second polymer compound was 80% by mass based on the total of the first polymer compound and the second polymer compound.

<Evaluation 1>

Examples 1-1 to 1-3, Comparative Examples 1-1 and 1-2

An ultraviolet absorber having a benzotriazole skeleton represented by Formula (1A) below at a ratio given in Table 1 was added to and dissolved in a mixture of a first polymer compound and a second polymer compound.

[Chem. 26]

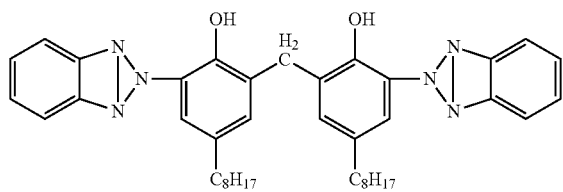

(1A)

As the first polymer compound, a polyamic acid represented by Formula (101) below was used.

[Chem. 27]

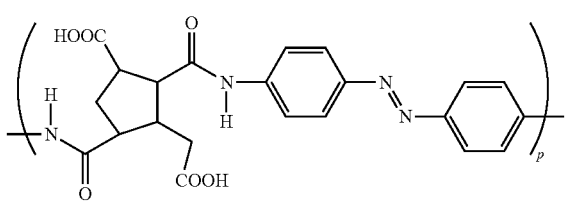

(101)

(where p represents the degree of polymerization.)

As the second polymer compound, a polyamic acid represented by Formula (102) below was used.

[Chem. 28]

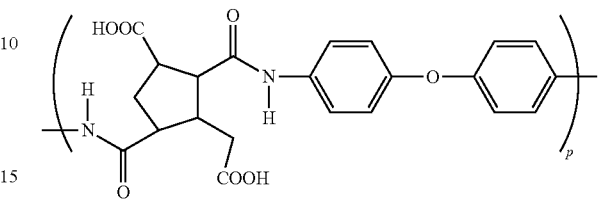

(102)

(where p represents the degree of polymerization.)

Next, the prepared composition was applied to a surface of a substrate having ITO electrodes for the FFS mode (hereafter referred to as "substrate A") and to a surface of a counter substrate having no electrode (hereafter referred to as "substrate B") to deposit films.

Subsequently, after being pre-fired at 90° C. for 5 minutes, the deposited composition was fired at 120° C. for 20 minutes.

An alignment process was then performed by irradiating the thin films of the composition with linearly polarized ultraviolet light having a main wavelength of 360 nm at a dose of 2 J/cm² in the substrate normal direction.

The films subjected to the alignment process were then fired at 230° C. for 40 minutes to form alignment films having a double-layer structure.

Each resulting alignment film included a first alignment film which was a polyimide whose raw material was Formula (101) above and a second alignment film which was a polyimide whose raw material was Formula (102) above.

Subsequently, by using a dispenser, an ultraviolet curable sealant (Photolec S-WB, manufactured by Sekisui Chemical Company, Limited) was drawn on the alignment film on the substrate A. Furthermore, a positive liquid crystal composition having an alkenyl group was dropped onto the alignment film on the substrate B.

After both substrates were bonded together under vacuum, the sealant was cured by irradiating the sealant with ultraviolet light having a wavelength of 340 to 450 nm. Additionally, heating was performed at 130° C. for 40 minutes to thermally cure the sealant and to perform a realignment process to enable the liquid crystal layer to have an isotropic phase, followed by cooling to room temperature. Each test cell (liquid crystal cell) of a liquid crystal display device for <Evaluation 1> was thus obtained.

Table 1 is a table giving the results of <Evaluation 1>.

TABLE 1

| | Content of ultraviolet absorber/ 100 parts by mass of mixture | Appearance of alignment films | Before durability test | | After durability test | |
|---|---|---|---|---|---|---|
| | | | VHR (%) | rDC (mV) | VHR (%) | rDC (mV) |
| Example 1-1 | 5 | Good | 99.5 | −20 | 89.3 | 90 |
| Example 1-2 | 10 | Good | 99.5 | −20 | 93.4 | 70 |
| Example 1-3 | 15 | Good | 99.5 | −20 | 96.2 | 10 |

TABLE 1-continued

| | Content of ultraviolet absorber/ 100 parts by mass of mixture | Appearance of alignment films | Before durability test VHR (%) | Before durability test rDC (mV) | After durability test VHR (%) | After durability test rDC (mV) |
|---|---|---|---|---|---|---|
| Comparative Example 1-1 | 20 | Cloudy | 99.5 | −20 | 98.0 | −10 |
| Comparative Example 1-2 | 0 | Good | 99.5 | −20 | 82.5 | 230 |

The evaluation results indicate that in the cases of the liquid crystal cells in Examples 1-1 to 1-3, the alignment films had a good appearance and that a decrease in VHR and an increase in residual DC from before to after the durability test were successfully suppressed.

On the other hand, it was confirmed that in the case of the liquid crystal cell in Comparative Example 1-1, the alignment films were cloudy, even though a decrease in VHR and an increase in residual DC from before to after the durability test were successfully suppressed. Furthermore, in Comparative Example 1-2, the VHR and the residual DC after the durability test were degraded.

<Evaluation 2>

Examples 2-1 to 2-3, Comparative Examples 2-1 and 2-2

An ultraviolet absorber having a benzotriazole skeleton represented by Formula (1A) above at a ratio given in Table 2 was added to and dissolved in a mixture of a first polymer compound and a second polymer compound.

As the first polymer compound, a polysiloxane having a siloxane skeleton represented by Formula (20) below and having a vertical alignment group represented by Formula (Z-224) below as a Z unit included as a side chain was used.

[Chem. 29]

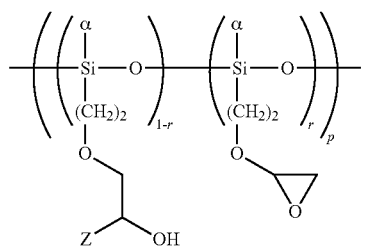

(20)

(where r is 0<r<1.0. (1−r) and r each represent the copolymerization ratio of a structural unit, and p represents the degree of polymerization.)

[Chem. 30]

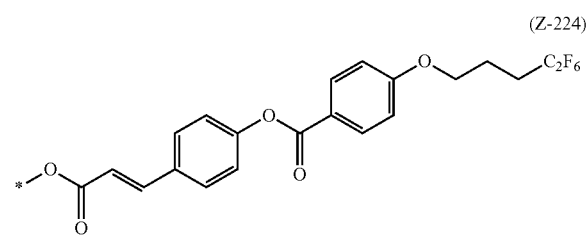

(Z-224)

As the second polymer compound, a polyamic acid represented by Formula (201) below was used.

[Chem. 31]

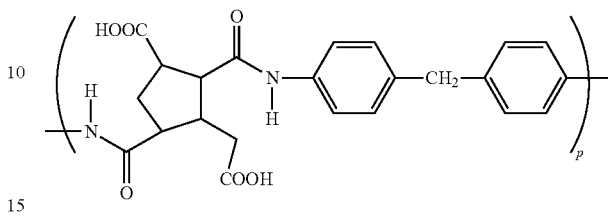

(201)

(where p represents the degree of polymerization.)

Next, the prepared composition was applied to a surface of a substrate having ITO electrodes for the UV2A mode (hereafter referred to as "substrate C") and to a surface of a counter substrate having no electrode (hereafter referred to as "substrate D") to deposit films.

Subsequently, after being pre-fired at 90° C. for 5 minutes, the deposited composition was fired at 230° C. for 40 minutes.

An alignment process was then performed by irradiating the thin films of the composition with linearly polarized ultraviolet light having a main wavelength of 330 nm at a dose of 25 mJ/cm$^2$ in an oblique direction at an angle of 40° with respect to the substrate. Alignment films having a double-layer structure were thus formed.

Each resulting alignment film included a first alignment film which was a polysiloxane whose raw material were Formulas (20) and (Z-224) above and a second alignment film which was a polyimide whose raw material was Formula (201) above. It was confirmed that a large amount of the compound represented by Formula (1A) above which was used as an ultraviolet absorber was distributed on a side closer to the second alignment film in a measurement using TOF-SIMS (Time-of-Flight Secondary Ion Mass Spectrometry) in the thickness direction of the alignment films under reduced pressure at room temperature.

Subsequently, by using a dispenser, an ultraviolet curable sealant (Photolec S-WB, manufactured by Sekisui Chemical Company, Limited) was drawn on the alignment film on the substrate C. Furthermore, a negative liquid crystal composition having an alkenyl group was dropped onto the alignment film on the substrate D.

After both substrates were bonded together under vacuum, the sealant was cured by irradiating the sealant with ultraviolet light having a wavelength of 340 to 450 nm. Additionally, heating was performed at 130° C. for 40 minutes to thermally cure the sealant and to perform a realignment process to enable the liquid crystal layer to have an isotropic phase, followed by cooling to room temperature. Each test cell (liquid crystal cell) of a liquid crystal display device for <Evaluation 2> was thus obtained.

Table 2 is a table giving the results of <Evaluation 2>.

TABLE 2

| | Content of ultraviolet absorber/ 100 parts by mass of mixture | Appearance of alignment films | Before durability test VHR (%) | Before durability test rDC (mV) | After durability test VHR (%) | After durability test rDC (mV) |
|---|---|---|---|---|---|---|
| Example 2-1 | 5 | Good | 99.4 | −20 | 90.2 | 100 |
| Example 2-2 | 10 | Good | 99.4 | −20 | 92.8 | 60 |

TABLE 2-continued

| | Content of ultraviolet absorber/ 100 parts by mass of mixture | Appearance of alignment films | Before durability test VHR (%) | Before durability test rDC (mV) | After durability test VHR (%) | After durability test rDC (mV) |
|---|---|---|---|---|---|---|
| Example 2-3 | 15 | Good | 99.4 | −20 | 95.0 | 30 |
| Comparative Example 2-1 | 20 | Cloudy | 99.3 | −20 | 96.8 | 0 |
| Comparative Example 2-2 | 0 | Good | 99.4 | −20 | 88.5 | 140 |

The evaluation results indicate that in the cases of the liquid crystal cells in Examples 2-1 to 2-3, the alignment films had a good appearance and that a decrease in VHR and an increase in residual DC from before to after the durability test were successfully suppressed.

On the other hand, it was confirmed that in the case of the liquid crystal cell in Comparative Example 2-1, the alignment films were cloudy, even though a decrease in VHR and an increase in residual DC from before to after the durability test were successfully suppressed. Furthermore, in Comparative Example 2-2, the VHR and the residual DC after the durability test were degraded.

<Evaluation 3>

Examples 3-1 to 3-3, Comparative Examples 3-1 and 3-2

An ultraviolet absorber having a benzotriazole skeleton represented by Formula (1A) above at a ratio given in Table 3 was added to and dissolved in a mixture of a first polymer compound and a second polymer compound.

As the first polymer compound, a polyamic acid represented by Formula (104) below was used.

[Chem. 32]

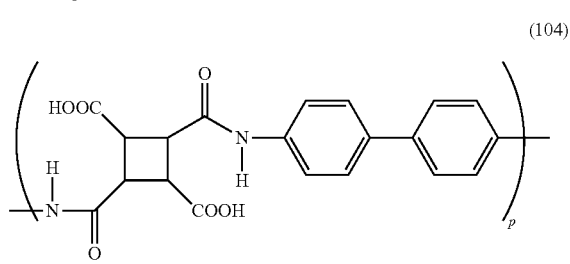

(104)

(where p represents the degree of polymerization.)

As the second polymer compound, a polyamic acid represented by Formula (102) below was used.

[Chem. 33]

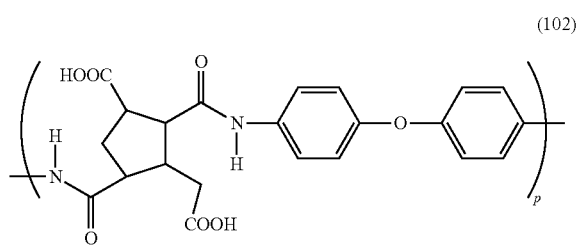

(102)

(where p represents the degree of polymerization.)

Next, the prepared composition was applied to a surface of the substrate A and to a surface of the substrate B to deposit films.

Subsequently, after being pre-fired at 90° C. for 5 minutes, the deposited composition was fired at 200° C. for 20 minutes.

An alignment process was then performed by irradiating the thin films of the composition with linearly polarized ultraviolet light having a main wavelength of 250 nm at a dose of 1 J/cm$^2$ in the substrate normal direction.

The films subjected to the alignment process were then fired at 200° C. for 40 minutes to form alignment films having a double-layer structure.

Each resulting alignment film included a first alignment film which was a polyimide whose raw material was Formula (104) above and a second alignment film which was a polyimide whose raw material was Formula (102) above.

Subsequently, by using a dispenser, an ultraviolet curable sealant (Photolec S-WB, manufactured by Sekisui Chemical Company, Limited) was drawn on the alignment film on the substrate A. Furthermore, a negative liquid crystal composition having an alkenyl group was dropped onto the alignment film on the substrate B.

After both substrates were bonded together under vacuum, the sealant was cured by irradiating the sealant with ultraviolet light having a wavelength of 340 to 450 nm. Additionally, heating was performed at 130° C. for 40 minutes to thermally cure the sealant and to perform a realignment process to enable the liquid crystal layer to have an isotropic phase, followed by cooling to room temperature. Each test cell (liquid crystal cell) of a liquid crystal display device for <Evaluation 3> was thus obtained.

Table 3 is a table giving the results of <Evaluation 3>.

TABLE 3

| | Content of ultraviolet absorber/ 100 parts by mass of mixture | Appearance of alignment films | Before durability test VHR (%) | Before durability test rDC (mV) | After durability test VHR (%) | After durability test rDC (mV) |
|---|---|---|---|---|---|---|
| Example 3-1 | 5 | Good | 99.1 | 10 | 88.7 | 100 |
| Example 3-2 | 10 | Good | 99.2 | 20 | 92.1 | 80 |
| Example 3-3 | 15 | Good | 99.2 | 20 | 94.9 | 50 |
| Comparative Example 3-1 | 20 | Cloudy | 99.2 | 20 | 96.1 | 40 |
| Comparative Example 3-2 | 0 | Good | 99.1 | 10 | 83.9 | 320 |

The evaluation results indicate that in the cases of the liquid crystal cells in Examples 3-1 to 3-3, the alignment films had a good appearance and that a decrease in VHR and an increase in residual DC from before to after the durability test were successfully suppressed.

On the other hand, it was confirmed that in the case of the liquid crystal cell in Comparative Example 3-1, the alignment films were cloudy, even though a decrease in VHR and an increase in residual DC from before to after the durability test were successfully suppressed. Furthermore, in Comparative Example 3-2, the VHR and the residual DC after the durability test were degraded.

The above-described results indicate the usefulness of the examples of the present invention.

INDUSTRIAL APPLICABILITY

An aspect of the present invention can be applied to, for example, compositions for forming alignment films required to realize liquid crystal display devices having high durability.

REFERENCE SIGNS LIST

- 10 element substrate
- 11 TFT substrate
- 12 alignment film for element substrate
- 13, 23 second alignment film
- 14, 24 first alignment film
- 19 first polarizer
- 20 counter substrate
- 21 color filter substrate
- 22 alignment film for counter substrate
- 29 second polarizer
- 30 liquid crystal layer
- 40 sealing member
- 100 liquid crystal display device

The invention claimed is:

1. A composition comprising a first polymer compound having a photoreactive functional group, a second polymer compound, and an ultraviolet absorber having a benzotriazole skeleton,
wherein a content of the ultraviolet absorber is less than 20 parts by mass per 100 parts by mass of a total of the first polymer compound and the second polymer compound,
wherein the ultraviolet absorber is a compound represented by formula (1) below:

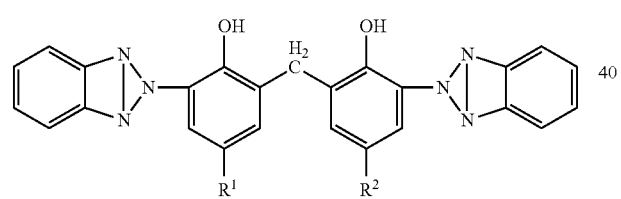

(1)

(where $R^1$ and $R^2$ each independently represents a hydrocarbon group of 1 to 30 carbon atoms),
wherein the first polymer compound is a compound represented by one of the following formulae: (101); (20) and (Z-224); and (104), and
wherein the second polymer compound is a compound represented by one of the following formulae: (102); and (201),
(where p represents the degree of polymerization),

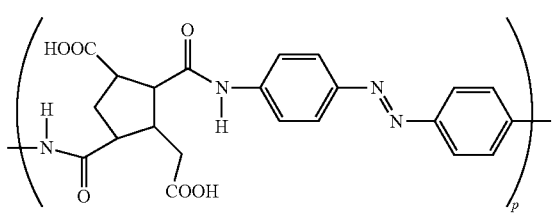

(101)

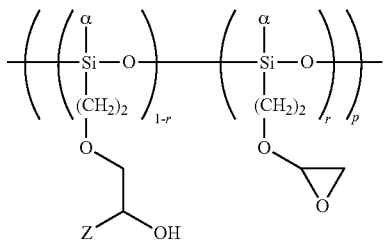

(20)

(where r is 0<r<1.0, (1-r) and r each represents the copolymerization ratio of a structural unit, and p represents the degree of polymerization),

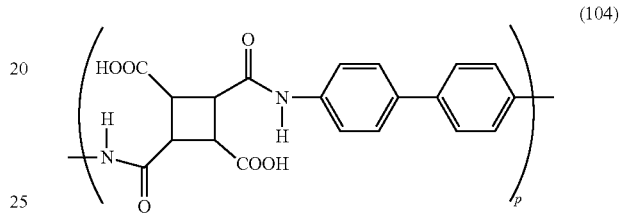

(104)

(where p represents the degree of polymerization),

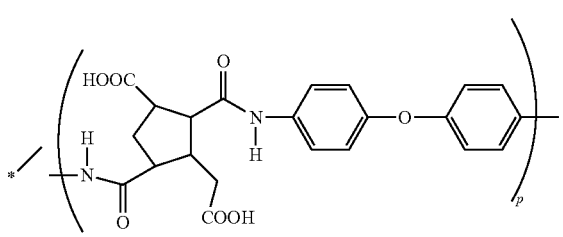

(102)

(where p represents the degree of polymerization),

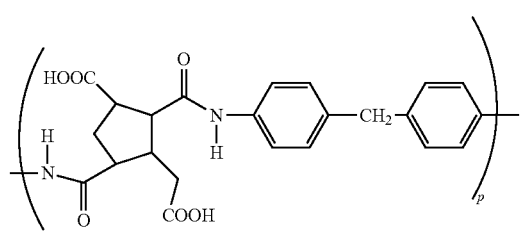

(201)

(where p represents the degree of polymerization).

2. The composition according to claim 1, wherein the ultraviolet absorber has a molecular weight of 600 or more.

3. The composition according to claim 1, wherein the content of the ultraviolet absorber is 5 parts by mass or more per 100 parts by mass of the total of the first polymer compound and the second polymer compound.

4. The composition according to claim 1, wherein
the first polymer compound is a polyimide, a polyamic acid, a polyamide, a polysiloxane, or a polyvinyl, and
the second polymer compound is a polyimide, a polyamic acid, a polyamide, a polysiloxane, or a polyvinyl.

5. The composition according to claim 1, wherein the photoreactive functional group is a group having an azobenzene skeleton, a cinnamate skeleton, or a cyclobutane ring.

6. A liquid crystal display device comprising:
a pair of substrates,
a liquid crystal layer sandwiched between the pair of substrates, and
alignment films disposed on surfaces of the pair of substrates, the surfaces being on a side closer to the liquid crystal layer,
wherein the liquid crystal layer contains a liquid crystal material,
at least one of the alignment films on the pair of substrates is a multilayer film including:
a first alignment film disposed on the side closer to the liquid crystal layer, and
a second alignment film disposed between the first alignment film and the substrate,
the first alignment film contains the first polymer compound,
the second alignment film contains the second polymer compound, and
the multilayer film is formed from the composition according to claim 1.

7. The liquid crystal display device according to claim 6, wherein the liquid crystal material contains a compound having an alkenyl skeleton.

8. The liquid crystal display device according to claim 7, wherein the liquid crystal material is at least one selected from the group consisting of compounds represented by formulae (C1) to (C4) below:

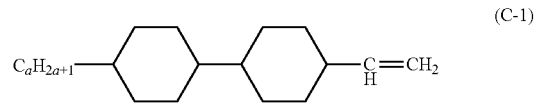
(C-1)

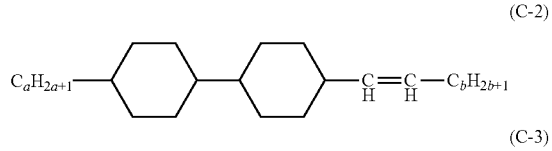
(C-2)

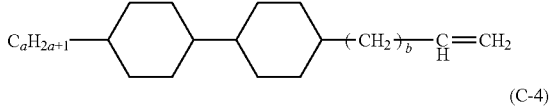
(C-3)

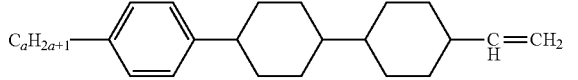
(C-4)

(where a and b, each independently represents an integer of 1 to 6).

9. The liquid crystal display device according to claim 6, wherein
the liquid crystal material is negative, and
the photoreactive functional group is a group having a cyclobutane ring.

* * * * *